United States Patent
Stoner et al.

(10) Patent No.: US 7,398,473 B2
(45) Date of Patent: Jul. 8, 2008

(54) IN SITU USER INTERFACE TEMPLATE EDITING

(75) Inventors: Charles Robert Stoner, Seattle, WA (US); Peter Faraday, Seattle, WA (US); DoRon Banu Motter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 11/120,275

(22) Filed: May 2, 2005

(65) Prior Publication Data

US 2006/0248480 A1    Nov. 2, 2006

(51) Int. Cl.
*G06F 3/00* (2006.01)
(52) U.S. Cl. .................. 715/762; 715/764; 715/765
(58) Field of Classification Search ............. 715/762, 715/764, 765, 255
See application file for complete search history.

(56) References Cited

U.S. PATENT DOCUMENTS

| | | | | |
|---|---|---|---|---|
| 5,821,937 A | * | 10/1998 | Tonelli et al. | 715/853 |
| 6,052,514 A | * | 4/2000 | Gill et al. | 715/733 |
| 6,643,663 B1 | * | 11/2003 | Dabney et al. | 707/102 |
| 6,684,369 B1 | * | 1/2004 | Bernardo et al. | 715/513 |
| 7,086,009 B2 | * | 8/2006 | Resnick et al. | 715/771 |
| 2003/0233614 A1 | * | 12/2003 | Mohamed | 715/501.1 |

* cited by examiner

*Primary Examiner*—Kieu D Vu
(74) *Attorney, Agent, or Firm*—Woodcock Washburn LLP

(57) ABSTRACT

In order to work with user interface documents containing instances of reusable templates which describe both the appearance and behavior for a user interface element, editing functionality is provided. The user interface document can be edited by selecting items from a view of the user interface document and indicating an edit to be performed. Edits may be to an underlying template or templates, or to properties of selected items. The scope of the edit is determined by user indication and/or defaults of user preference. Locks are provided in order to prevent accidental editing of some locked element or template. A graphical tree view, a list view (text-based tree view), or an artboard view may be presented to a user in order to facilitate the selection and editing process.

9 Claims, 4 Drawing Sheets

IN SITU USER INTERFACE TEMPLATE EDITING

FIELD OF THE INVENTION

The present invention relates generally to the field of software, and more particularly, to the creation, editing and use of user interface specifications including templates.

BACKGROUND OF THE INVENTION

Complex graphical user interfaces are used by applications and other software programs in order to facilitate user interaction. In order to be useful, such user interfaces are generally complex and include a variety of features and behaviors.

When such a complex user interface is created, the user interface (UI) is generally created by combining a number of user interface elements. These user interface elements may include elements which display information to a user (e.g. labels, status bars). User interface elements may also include elements which allow the user to control aspects of the UI (e.g. sliders, scrollbars). Some user interface elements may be hybrid elements, combining both display and control functionality (e.g. pulldown menus).

The creation of UI elements is time-intensive. A common and time-tested mechanism for enabling reuse of elements in graphical applications is the specification and use of templates. Those templates can be specified declaratively such as with a markup language. A template is a reusable specification that corresponds to a user interface element and describes, in general, the appearance and functionality of the user interface elements. (Microsoft Corporation's PowerPoint application calls such templates "masters"; Microsoft Corporation's Visio uses the term "stencil.")

In order to allow customization of a template, the template may be parameterized. The parameters (or "property values") of a parameterized template can be set independently on each element to which the template is applied in order to customize the element. In this way, flexibility of a re-usable element is enabled through a highly-parameterized template, and the appearance of the template in any particular instance is dictated to some degree by the particular properties set on that instance. For example, where a button template defines the appearance of a button control, the button template may include a property value which can be set to a text string. The property value allows the designer to specify text to display on the button. As a further example, a status bar template may be customized via properties on the template to display certain data to the user (and to include specific font, font color, font size, background color, etc.).

Thus, UI templates can be used to describe the appearance of user interface elements in a reusable and customizable manner and enable a clean separation between the appearance of a UI element and its behavior. As noted above, the appearance of a particular element is typically specified in markup language through one or more sharable templates and through some number of property values specific to that instance.

Templates may be used more than once within a given design. Each use of a template within a design is known as an instance of the template. The user experience when editing a template is a key factor in making effective use of templates. In many applications, any change to a template is automatically reflected in each instance of the template.

In the prior art, in building or editing a UI document within existing UI design tools, a designer can create and edit a packaged piece of artwork called a symbol. A symbol can be reused and each instance of a symbol can be edited. However, symbols are less rich and flexible than control templates as described above. Specifically, symbols do not provide a mechanism for declarative parameterization. While, as mentioned, in existing graphics tools, the user has the ability to edit symbols, differentiating instances requires editing each instance separately, and severing the link to the shared template. This may be sufficient to edit even a complex graphic, however, the limitations on symbols present problems for a UI designer. Because any differentiated instances are no longer related to the original template, subsequent changes to the template will need to be applied separately to each instance, and therefore a UI designer will waste time and effort in attempting to create the UI design they require.

Also, existing tools only allow the designer to edit within the context of a single symbol. Having the ability to edit only one symbol at a time fundamentally prevents editing operations that might span multiple symbols. Thus, for example, when designing the template for a scrollbar, it is often desirable that different arrow indicators are aligned with each other. If each arrow indicator is part of a separate button symbol, then they must be edited separately. There is no way to select the arrow indicators within both symbol instances and perform an alignment. The designer has to manually specify the properties for each element, and ensure that they are the same. Thus no operation which would be useful to apply to sets of arbitrary elements in the UI, within multiple symbols, can be performed. Alignment/positioning, editing of properties, and copying an element's appearance via an eyedropper tool are all simple examples of operations a designer could find useful in creating a control template or symbol. Because multiple symbols can not be edited simultaneously, these types of operations are more difficult.

UI elements are often placed within layout containers. A layout container is a certain type of UI element which specifies how its children should be arranged and sized. Constraints such as minimum and maximum size, space between elements, and how to position additional elements which are generated dynamically are all taken into account at runtime by a layout algorithm which calculates the locations and sizes of all elements in a page or application. As such, a design for a control template containing layout containers may have a different appearance when subjected to different sets of layout constraints. Since the template may be used for a container control, such as a menu or list, the appearance may vary when subjected to different content. The final goal for such a template is often to have a consistent appearance when subjected to a variety of content and constraints. Existing tools, as in the prior art, do not support symbols with content. Editing a template or symbol without instance specific content, as in the prior art, hampers the workflow by removing the direct feedback of seeing the effect of content on changes to the template.

In modern user interface systems, it is possible for a portion of a display page or underlying application to provide values for properties which override the defaults. For example on many web pages, similar regions may have a slightly varying appearance. In the design of such a feature, it is not necessary to provide a different template or symbol for these slight variations in appearance. Properties, such as background color, can be set or overridden for that portion of the document. A properly designed control template will be able to consume these locally set properties or resources. In the design of such a control template, the ability to see the impact of a variety of sets of locally set properties would be useful.

Thus, for the above reasons, among others, there is a need for an improved way to create, edit, and use UI elements which are rich and flexible, while allowing for increased flexibility in editing.

SUMMARY OF THE INVENTION

In order to provide improved user interface creation and editing, according to some embodiments of the invention an improved workflow for editing templates within the context of one or more actual instances of the template is enabled. Template instance property values and content may be edited, or templates themselves may be edited. A template may be created from scratch within an instance of the template, and multiple distinct templates may be edited simultaneously. Editing operations can be done to sets of elements spanning multiple template instances. Selective locking of templates can limit the context of the selection.

According to some embodiments of the invention, views of a user interface document are presented for a user. A tree view shows instances, properties, and templates interleaved in a single view for ease of understanding. An artboard view shows a preview of the user interface described by the document.

Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
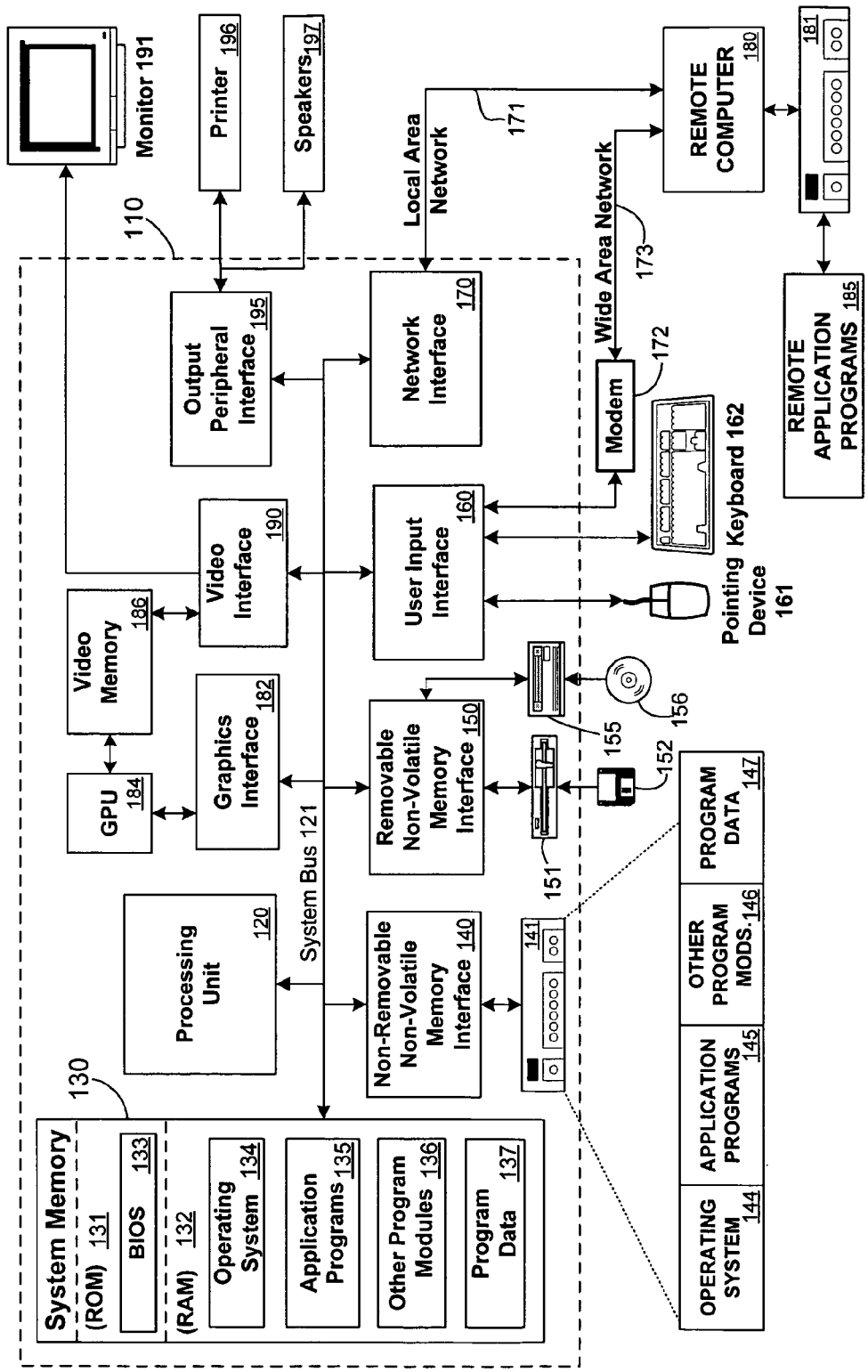
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Using Templates for UI Elements

As described above, templates can be used to allow the designer of a UI to include UI elements without needing to recreate them for each instance. Generally, a template defines the appearance of an element. This may be done by means of a markup language. As an example, a slider control "HorizontalColorSlider" may have the following template definition, defined in eXtensible Markup Language (XML):

```
<Template x:Name="HorizontalColorSlider">
    <Slider SliderOrientation="Horizontal"
        Minimum="0.0"
        Maximum="1.0"/>
    <Template.VisualTree>
        <Border Width="100%" Height="100%"
            Background="*Alias(Target=Background)"
            BorderBrush="*Alias(Target=BorderBrush)"
            BorderThickness="*Alias(Target=BorderThickness)">
            <Canvas Width="100%" Height="100%">
                <Path ID="thumb"
                    Fill="White" Stroke="Black"
                    Canvas.Left="*Alias(Target=Value)"
                    Canvas.Top="50%"
                    Data="M -5 5.5 L 0 0 L 5 5.5
                        L 5 7.5 L -5 7.5 Z"/>
            </Canvas>
        </Border>
    </Template.VisualTree>
</Template>
```

This template definition defines a horizontal slider control with a color gradient. As seen in the second through fourth lines above, the template may be associated with a particular control type, where the control is responsible for behavior. In this case the behavior is defined by the "Slider" control class. In lines five through nineteen above, the template refers to Template.VisualTree which specifies the visual appearance of the control. Certain properties of the associated Slider control are bound to properties on elements within the HorizontalColorSilder template visual tree (by specifying the property value of the visual tree element as an "*Alias()" of one of the control properties rather than an explicit value). Those properties are then parameters of the template. The values of those parameters are specific to each instance of the Slider to which this template is applied, and the values affect the appearance of each instance. For example, Background and BorderBrush are colors which are set for each instance of the Slider, and therefore the template. BorderThickness and Value are other examples of Slider properties that are bound to properties of visual elements within the template in this example.

Most UI controls are tied to some application state—either business objects or business logic—with the appearance of the control reflecting that state. In the case of a Slider, the control typically represents a single scalar value. The properties exposed by a control are typically either properties representing appearance such as Background and Border-Thickness, or properties exposing the underlying business object such as Value. The template may be bound to both types of properties. Those properties for appearance are typically controlled by the designer and represent the parameters of the template. As part of the appearance, the control template may include a set of visual states and animations which might be associated with particular values of properties on the control, such as Button.IsPressed==true or Slider.IsMouseOver==true. The control logic may set certain properties based on events received through the UI. Some may be appearance properties, such as setting IsMouseOver when the cursor enters or leaves the control; other properties may be tied to control logic. For example, the Slider control sets its Value property as the user clicks and drags within the Slider region. In the HorizontalColorSlider template, the Slider Value property is bound to the "Canvas.Left" property on one of its internal elements (a Path element which represents the slider indicator). The Canvas layout container parent of the Path uses this property to position its child element to reflect the relative value of the Slider Value property. Since the Slider is responsible for setting the Value property in response to mouse drags within the control, and the slider indicator is bound to that value, the slider indicator element tracks the mouse movement and presents the illusion of a direct interaction between the indicator and the mouse.

The bound properties in the HorizontalColorSlider template were all bound to properties on the associated Slider instance. In addition to being bound to properties on the associated control though, properties on elements in a template's visual tree may also be bound to properties exposed on other UI elements or to properties on other application business objects available to the UI.

An instance of the HorizontalColorSlider template may be created using the following example XML code:

```
<Slider Template="{HorizontalColorSlider}"
    Width="200px" Height="20px"
    Background="{MyGradient}" Value="*Bind
    (Path=Red)"/>
```

In this example, the instance has explicit instance specific values for the Width, Height and Background properties. The Value property for this instance is bound to the Red property on a business object defined in the Slider's context. If this Slider is used within a larger Color Dialog for instance, there may be a single Color business object tied to the entire Dialog instance, with this Slider tied to the Red component of that Color. Since the Slider is bound to some property on a business object, that property will be updated automatically when the Slider's value changes, and vice versa.

In Situ Template Editing

As described above, a user interface is created via a user interface "document" which is a representation of a tree of elements, as further described below. No specific format, type or language is specifically necessary for this document. In the tree of elements, some of the elements are primitives, which are simply responsible for rendering. Others are layout elements, which are responsible for sizing and arranging their immediate children. The majority of elements, in some cases, are higher-level behavioral elements called controls, responsible for responding to user events. When templates are reused, they may be used for multiple elements in the tree.

If multiple instances of a template exist, according to some embodiments of the invention, a user interface designer can decide which instances of a template should be edited, and then edit those instances (and no other instances of that template) in one action. As described below, either the template or properties may be edited for selected instances. Additionally, where properties are being edited, a user interface designer can decide whether the designer desires editing of the locally set properties of the template or editing of the locally set properties on the selected instance(s). In addition, a designer can view a combined view of the element tree, interleaving instance and template elements. In the following sections, we describe various embodiments of the invention, including those dealing with workflow for editing and the operations supported, and views presented, as well as describing the underlying architecture which supports these operations.

User Experience

A user interface document, according to one embodiment of the present invention, consists of elements in a hierarchy, with some elements being instances of a template. Since a template consists of elements which in turn may be instances of other templates, the system supports editing arbitrarily deep nesting of templates. An element, thus, may be created through the application of several different templates. The context of an element in the hierarchy may affect the element through layout behavior, inherited property values, property values bound from the containing template instance, and instance-specific content. A single template may be instantiated multiple times, but because of the context of each instance, may appear somewhat or significantly different in each instance.

In some embodiments of the invention, the user is presented with a view of the hierarchy, and allowed to select elements or templates for editing. A user may edit one or more template instances or a template itself.

When a user edits a template, the user selects a template instance in the view or otherwise indicates a template selection. If template editing is desired, any edits the user applies to an individual template instance are automatically reflected in other instances of that template. In embodiments where a view of the document is presented to the user, visual cues can be used to indicate the association between separate instances of a single template. For example, selecting one instance of a template in one embodiment causes other instances of that template to be highlighted in a distinct color.

When editing a template, according to some embodiments of the invention, the user has several alternatives: the user can change the template reference to point to another existing template; the user can create a new template from scratch; or the user can edit the existing template.

In order to change the template reference, according to one embodiment, the user is provided with a list of available templates for that element type. Templates can be defined by the system locally at the instance to which it is applied or at any ancestor "scope" of that instance in the document, and the system exposes the set of all templates of the appropriate type defined at any containing scope.

To create a new template for the element, several changes to the underlying document are necessary. A new template is created and attached at an ancestor element; the template reference on the element is changed to refer to the newly created template; and the new, empty template is "unlocked". This occurs for each element which uses the newly created template. In one embodiment of the invention, these steps are combined into a single user operation.

According to one embodiment of the invention, to edit the existing template, the user can either edit the original (potentially shared) template or clone the template before editing. In the latter case, the system again combines several steps— copying a template, changing the template reference on the element(s), and unlocking the copy—into a single user operation.

In one embodiment, when an element is added to the document, by default the user is editing the properties of that element, not of any associated template. In one embodiment, multiple templates can be edited at once (concurrently) by selecting instances of those templates and requesting template edit. The edit then performed by the user through each editing instruction will be performed on all templates indicated by the template instance selection.

Locking

In some embodiments of the invention, templates can be locked with respect to editing, in order to provide security against accidental changes which might occur if a user intending to edit an instance is permitted to edit the underlying template instead. This locking serves to limit the context of a selection since the selection operation may be implemented to select within the deepest parts of the tree that are unlocked. If a template is locked and the selection operation is performed by clicking on the desired element, then clicking on an instance of the template will select the instance. If instead the template is unlocked, clicking on an instance of the template might select the deepest part of the template visual tree that the cursor is over.

Locking also provides for an improved user experience by preventing a certain change to the document (the editing of a template) when intuitively a user might expect that user actions would result in a different change (the editing of one or more selected instance(s)).

In one embodiment, existing templates are locked by default. Locking an element (or template) prevents selecting and editing the element (or template) or any of its descendents. Locking simplifies the user experience by limiting the scope of the user's operations. Where a tree view of the document is presented to the user, since locking an element or template implicitly locks all descendents, the user can prevent selection for editing within a certain subtree of the tree using a single lock.

As indicated above, locked state is inherited. An element is only editable if the element and all of its ancestors within the same template are unlocked and the template itself is unlocked. In this implementation, template lock state is associated with the template definition, not the template reference. This means that if a template is locked in one instance, it is locked in all instances. Since a template is defined in one location in the tree but potentially referenced elsewhere, the template definition would be unlocked if all the ancestors of the template definition are unlocked, but an instance of the template might only be unlocked if both the definition and the instance where the template is reference are unlocked.

In-Situ User Editing

Figure 2:
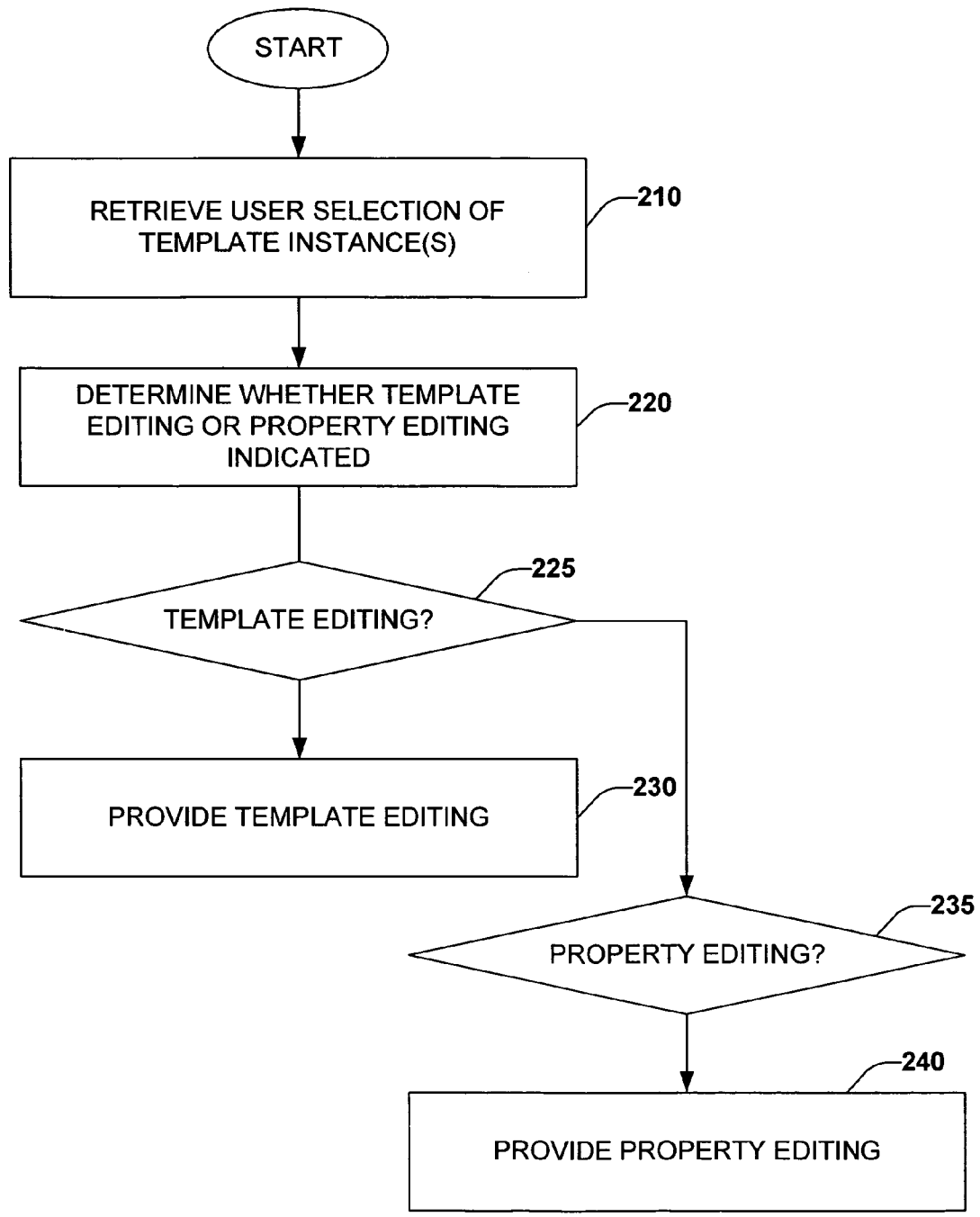
FIG. 2 is a flow diagram of a method for editing a user interface according to an embodiment of the invention.

FIG. 2 is a flow diagram of a method for editing a user interface made up of at least one user interface element which is specified by a template instance according to an embodiment of the invention. As shown in FIG. 2, step 210, a user selection of one or more template instances is received. The user selection may be done, for example, by clicking (or other user input means) on areas on a graphical view of the hierarchy. The user selection may also be done in other ways. For example, the view may be a list of template instances, a list of user interface elements, or any other presentation of some or all of the information about the items making up the user interface. In some embodiments, a user selection is implicit via a default specific to the implementation of the user interface editor. For example, in one embodiment a default selection of all template instances in a user interface occurs when the user interface document is opened for editing. In such a case, when the user requests editing before making any explicit selection of template instances to edit, the selection of all template instances is made, based on the default. In other cases, other defaults may apply to create a selection of template instances.

In step 220, it is determined whether template editing relating to the selected template instances is desired, or whether property editing related to those instances is desired. As discussed above, in some embodiments of the invention, in the absence of a positive (explicit) specification by the user that template editing is desired, an implicit determination that property editing of the template instances selected will be assumed.

If template editing is desired, decision box 225, then template editing functionality will be provided to the user, step 230. If property editing is desired, step 235, then property editing functionality will be provided to the user, step 240.

Where template editing is provided, if all template instances correspond to a single template, according to some embodiments, that template is edited. In one such embodiment, the edited template is saved as a new template and applied to the selected template instances. Otherwise, in some embodiments, the template itself can be edited, and the change in the template will be applied to any other template instances.

As discussed above, in some embodiments, locking is provided for templates. If the template is locked, then no changes can be made to that template.

In some embodiments, template editing is accomplished by selecting an existing template, and applying that template to all the selected template instances.

Property editing functionality, in some embodiments, allows the user to specify a new value for a property on the template instances. The property may not be valid in each selected template instance, but it is set to the new value for any template instances in which it is valid. More than one property may be given new values in this way.

Figure 3:
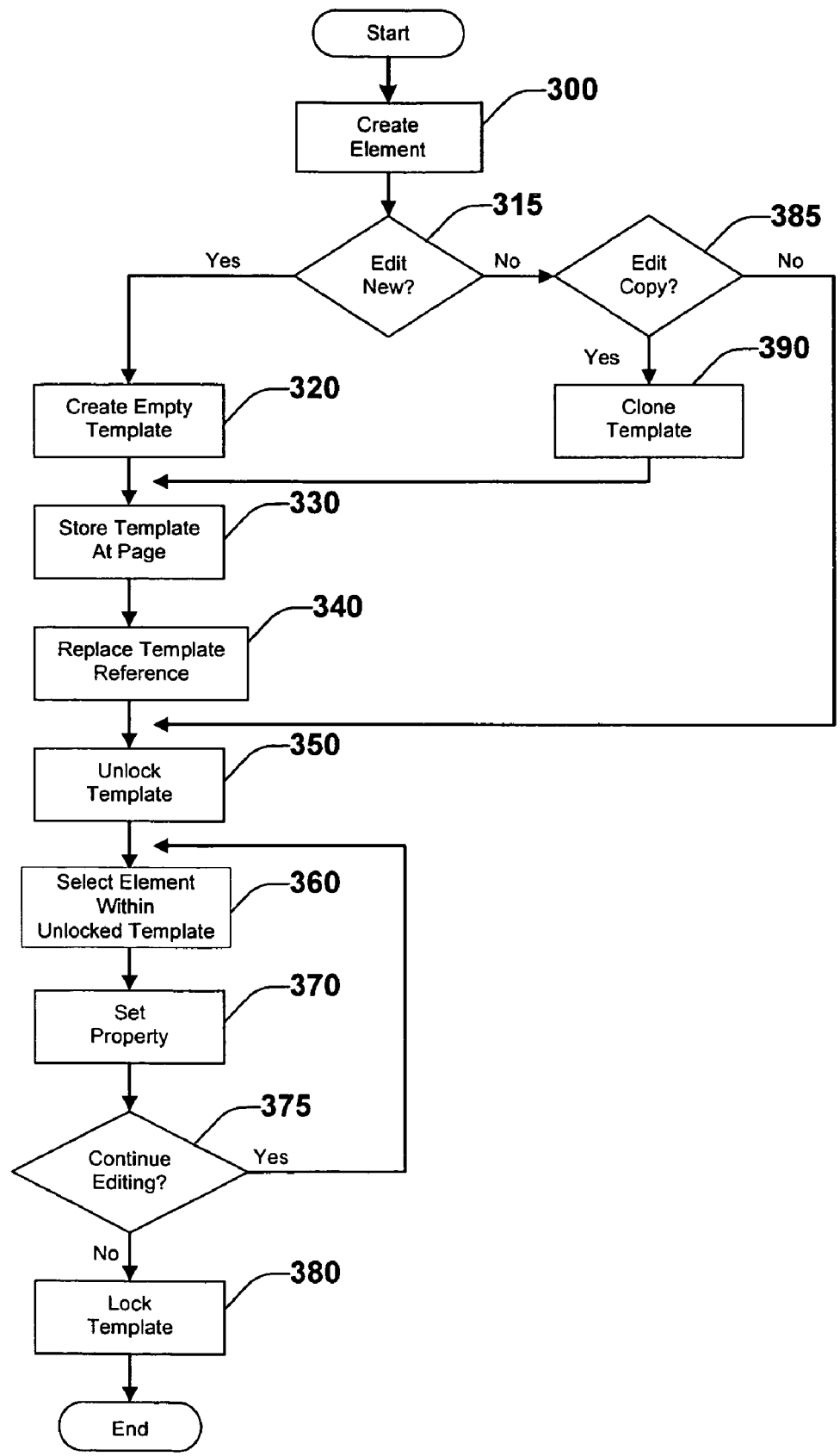
FIG. 3 is a flow diagram of a method for editing templated properties of elements in a user interface according to an embodiment of the invention.

FIG. 3 is a flow diagram of a method for editing templated properties of elements in a user interface according to an embodiment of the invention. Steps above step 350 in FIG. 3 show how an element may be created and associated with a template. Steps 350, 360, 370, 380, and decision box 375 show how properties of elements associated with a template can be edited.

As shown in FIG. 3, the element is created in step 300. To apply a template instance to the element created, first, it must be determined whether a new template is to be applied, decision box 315. It is common for UI elements to include a default template. If a new template is to be applied, an empty template is created, step 320. The template is then stored in step 330. In some embodiments of the invention, a scope for the new template is defined in order to allow sharing. In one embodiment the scope is the outermost ("page") scope. The template reference in the element is then changed to reflect the stored template, step 340.

If the template to be applied is not new, decision box 315, then either the template is to be directly edited or a copy of the template is to be edited. If a copy is to be edited (decision box 385) the template is cloned at step 390, and the template is stored, step 330, and the process continues from there. If the template to be applied is not new and the template itself and not a copy is to be edited, then there is no need to create an empty template (at step 320) as would be the case for a new template, or to create a clone (at step 390) and store the template. This option is only available to the user if the template is not a default template.

Elements which are associated with templates can be edited as shown starting from step 350 of FIG. 3. The template is unlocked, step 350. Then the properties of an element within the template can be edited. An element within the unlocked template is selected, step 360, and a property on this element is set to a new value, step 370. These steps of selecting and editing properties for elements occur until all editing is complete, as indicated by decision box 375. After editing, the template can be locked 380.

UI Document Representations

In order to support the operations outlined above, the implementation maintains multiple representations of the UI document. A primary representation or "document model" serves as the authority on the state of the UI document. In one embodiment, from this primary representation one or more "views" of the document can be derived for a user. These views are responsible for presenting the document state to the user in a meaningful way.

The primary representation (the "model") is a collection of independent templates. (The top level element tree in the document can be considered a template for which there is a single instance in the editor.) Templates may be named, and elements within each template may refer to one or more of the templates by name. (For hierarchical user interface elements, it is valid to have circular template references where elements within a template refer directly or indirectly to the containing template.)

In some secondary representations of the document ("views" on to the model), the template trees of the model are expanded and inserted at the point where they are referenced. The view trees are used for editing, but are not necessarily persisted. Each node in the view tree maintains a link back to the corresponding node within the appropriate template. The view node also contains the unique "path" to that particular instantiation from the document root.

To illustrate this, consider a document which presents the user interface of a dialog box containing a combobox and "OK" and "Cancel" buttons, where custom templates exist for each of the combobox and button, and where the combobox includes an open/close button using the same template as the "OK" and "Cancel" buttons.

Figure 4:
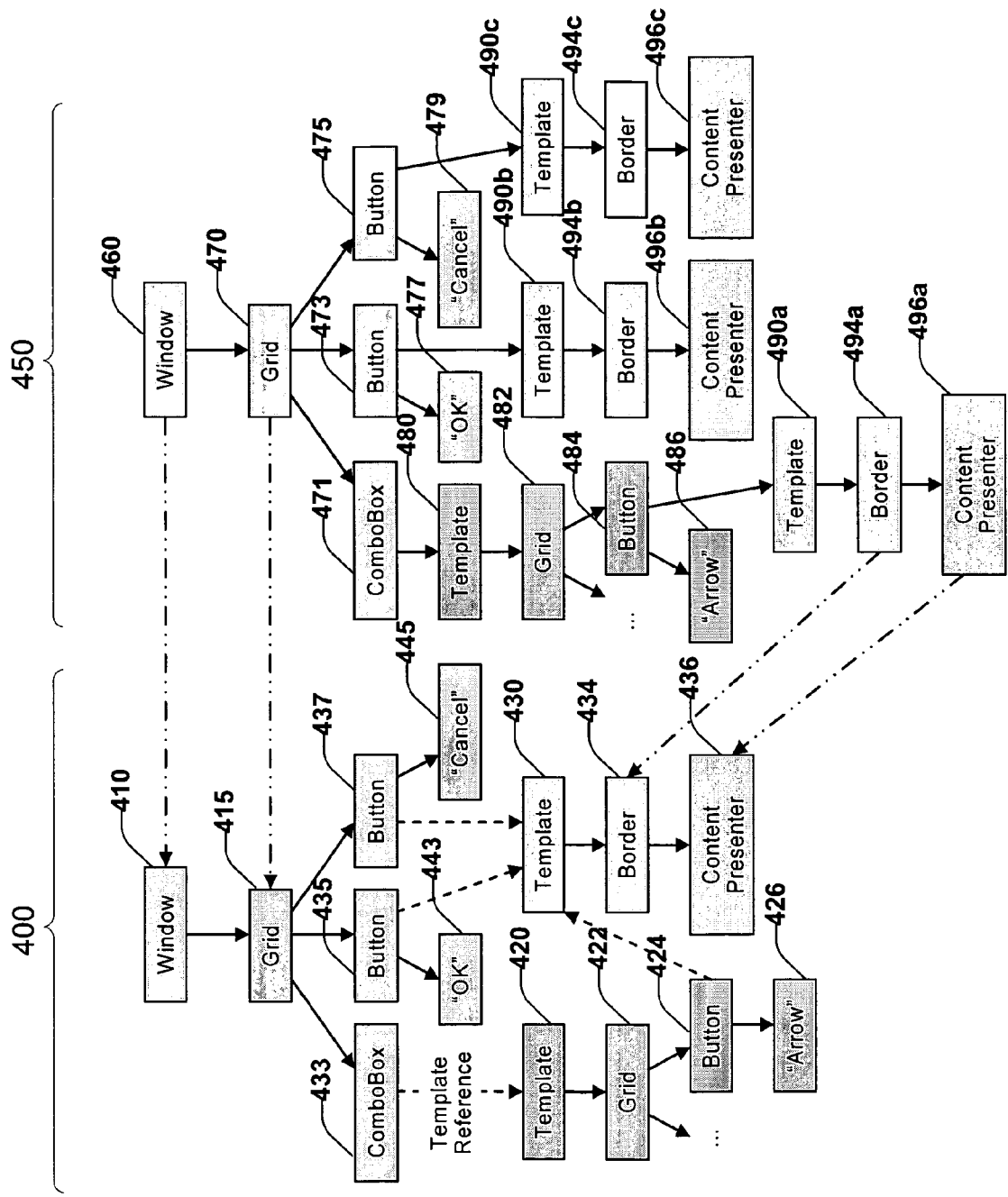
FIG. 4 is a block diagram showing a model and a tree view and their relationship according to one embodiment of the invention.

For such an example, one possible model and one possible tree view representation are shown in FIG. 4. FIG. 4 shows a model 400 and a tree view 450, and the connection between them. In the model 400, there are three distinct trees. One has the root node Window 410, one has the root node Template 420 and one has the root note Template 430. Template 420 is the template for a combobox. Template 430 is the template for a button. The three distinct trees in model 400 are linked by template references. These referential relationships between template instance and template, in tree view 400, are shown as dashed-line arrows. The two buttons included in Button 424, Button 435 and Button 437 each reference the button Template 430. Button 435 includes property 443 which provides a label for one button, and Button 437 includes property 445 which provides a label for the other button. The button Template 430 includes a Border 434 for the button and a content presenter 436 which provides a display mechanism for any instance specific content such as a button label. The ComboBox 433 is an element which references combobox Template 420. That includes a Grid 422, which may include other children, but which does include a Button 424. Button 424 also references Button template 430. Button 424 includes a different label 426. Thus button Template 430 is referenced in three places, including within the combobox template. Button 435, Button 437, Button 424 and ComboBox 433 are all instances of their respective templates.

In the tree view 450 corresponding to model 400, there is a single tree. Each Button instance in the tree view 450 contains a separate expansion of the Button template tree. Thus Window 460, Grid 470, ComboBox element 471, Buttons 473 and 475, properties 477 and 479 appear similar to the corresponding parts of the model 400. However, combobox template 480 is shown as a direct descendant of ComboBox element 471. The button Template 430 is shown three times, as Template 490a, 490b, and 490c, corresponding to the three references to it in model 400. These three instances are direct descendants of the button elements 473, 475 and 484 which are instances of the button Template 430. Each referential relationship between a button element and a template element is shown as an arrow. Border 494a, 494b, and 494c and Content Presenter 496a, 496b, and 496c are similarly repeated in the tree view 450. Thus, paths within the model may not have a one-to-one mapping with paths in the tree view.

Shared templates are defined outside of any particular instance—either at an ancestor common to all instances or in an external document. The system merges the trees defined in different scopes and potentially different files, and provides a single editing experience. The system handles pushing the changes to the appropriate scopes and/or files.

Another tree view may be provided by means of a list. For example, the model presented in FIG. 4 may be presented in a list view as shown in Table 1:

TABLE 1

List View

```
Window
    Grid
        ComboBox
            ComboBox Template
                Grid
                    ...
                    Button
                        "Arrow"
                        Button Template
                            Border
                                Content Presenter
        Button
            "OK"
            Button Template
                Border
                    Content Presenter
        Button
            "Cancel"
            Button Template
                Border
                    Content Presenter
```

The list view may be used along with a tree view or instead of one. In a list view, each item in the model is displayed, and indentation is used in order to show the hierarchy. In some embodiments, a list view may provide a user with the ability to show or hide descendents below a specific item. This expansion of the tree view or list view can be limited by the user. In embodiments in which locking is provided, until the user explicitly expands or unlocks an element or template, it cannot be edited, and thus it is not necessary to build out the corresponding part of the view. This is known as lazy expansion of templates, where the sub tree representing the template is not added to the template instance in the view tree until the template at that instance is visible in the view. (In the example depicted in FIG. 4, the sub trees corresponding to the button template 430 beneath button instances 473, 475 and 484 would not need to be constructed and attached in a tree or list view until the corresponding button instances in the view are expanded.) Lazy expansion is necessary to support editing cyclical template references, and also provides a potential performance improvement.

In one embodiment an artboard view is presented the user. The artboard view displays the UI described by the document as it will appear in its current form. Items in the artboard view may be selected for editing as well. Where a tree view is also being displayed for a user, in one embodiment the selection is shown on the tree view. The selection may be shown in the tree view or artboard view, e.g., by color, indicators (such as arrows), or by any other graphical indication. The artboard allows the user to view results of actions performed on the model.

In one embodiment, the artboard view provides the user with the ability to perform editing functions. For example, an artboard view may provide editing tools which can be used in conjunction with the selection of items on the artboard view. Where, for example, several elements are selected on the artboard view, a paintbrush tool is provided for the user. When the user selects the paintbrush tool, all elements on the artboard view are edited to conform to a specific coloring scheme. This may be performed by editing a template or editing properties on the selected elements. Defaults as described above may control whether a template or properties on the elements are edited; in one embodiment the artboard allows the user to make a selection of whether template editing or property editing is desired. Other editing tools such as (without limitation) resizing, moving, synchronizing location, synchronizing animations, etc., are also contemplated.

In one embodiment, the artboard view uses a template instantiation mechanism for display. The associated tree view is used as an internal data structure to represent the expanded tree the user sees and to maintain an association between the actual display elements and the underlying model which serves as their specification. The template instantiation handles property value resolution when there is overlap between instance specific values, inherited values and template specific values. The system described here is responsible for supporting edits of the property values at the appropriate part of the tree.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for editing a user interface comprising at least one user interface element specified at least in part by one or more template instances, each of said template instances specified at least in part by at least one template, said method comprising:
   receiving a user selection of one or more selected template instances from among said template instances;
   determining whether template editing relating to said user selection is desired or whether property editing related to said user selection is desired;
   if template editing relating to said user selection is desired, providing functionality for user editing of a template corresponding to said selected template instances by:
      determining at least one target template corresponding to said selected template instances; and
      providing functionality for performing an edit to said at least one target template; and
   applying the edit to all template instances corresponding to the at least one target template; and
   if property editing related to said user selection is desired, providing functionality for user editing of at least one property of said selected instances, the functionality for user editing of the at least one property of said selected instances comprising
      creating a user interface element to which a template is to be applied, the user interface element having a plurality of properties and a template reference;
      determining whether the template to be applied to the user interface element is a new template, an existing template, or a copy of the existing template;
      if the template to be applied to the user interface element is a new template, creating an empty template, storing the empty template, and changing the template reference to reflect the stored template;
      if the template to be applied to the user interface element is a copy of the existing template, creating the copy of the existing template, storing the copy of the existing template, and changing the template reference to reflect the stored template;
      unlocking the template to be applied to the element;
      receiving a user selection of at least one property of the user interface element;
      setting the at least one selected property of the user interface element to a new value; and
      locking the template to be applied to the user interface element.

2. The method of claim 1, where said step of determining whether template editing relating to said user selection is desired or whether property editing related to said user selection is desired comprises:
   determining whether an indication has been made that template editing is desired; and
   if no such indication has been made, determining that property editing related to said user selection is desired.

3. The method of claim 1, where said step of providing functionality for user editing of at least one property of said selected instances comprises:
   receiving a new value for said at least one property;
   setting a value for said at least one property to said new value in each of said selected instances in which said property is valid.

4. The method of claim 1, further comprising:
provilding functionality for accepting a user indication that a template is indicated to be locked; and
providing functionality for accepting a user indication that a template is not indicated to be locked.

5. A computer-readable storage medium for editing a user interface comprising at least one user interface element specified at least in part by one or more template instances, each of said template instances specified at least in part by at least one template, said computer-readable storage medium comprising computer-executable instructions for performing steps comprising:
receiving a user selection of one or more selected template instances from among said template instances;
determining whether template editing relating to said user selection is desired or whether property editing related to said user selection is desired;
if template editing relating to said user selection is desired, providing functionality for user editing of a template corresponding to said selected template instances by:
determining at least one target template corresponding to said selected template instances; and
providing functionality for performing an edit to said at least one target template; and
applying the edit to all template instances corresponding to the at least one target template; and
if property editing related to said user selection is desired, providing functionality for user editing of at least one property of said selected template instances, the functionality for user editing of the at least one property of said selected instances comprising
creating a user interface element to which a template is to be applied, the user interface element having a plurality of properties and a template reference;
determining whether the template to be applied to the user interface element is a new template, an existing template, or a copy of the existing template;
if the template to be applied to the user interface element is a new template, creating an empty template, storing the empty template, and changing the template reference to reflect the stored template;
if the template to be applied to the user interface element is a copy of the existing template, creating the copy of the existing template, storing the copy of the existing template, and changing the template reference to reflect the stored template;
unlocking the template to be applied to the element;
receiving a user selection of at least one property of the user interface element;
setting the at least one selected property of the user interface element to a new value; and
locking the template to be applied to the user interface element.

6. The computer-readable storage medium of claim 5, where said step of determining whether template editing relating to said user selection is desired or whether property editing related to said user selection is desired comprises:
determining whether an indication has been made that template editing is desired; and
if no such indication has been made, determining that property editing related to said user selection is desired.

7. The computer-readable storage medium of claim 5, where said step of providing functionality for user editing of at least one property of said selected instances comprises:
receiving a new value for said at least one property;
setting a value for said at least one property to said new value in each of said selected instances in which said property is valid.

8. The computer-readable storage medium of claim 5, further comprising computer-executable instructions for performing the steps of:
providing functionality for accepting a user indication that a template is indicated to be locked; and
providing functionality for accepting a user indication that a template is not indicated to be locked.

9. A system for editing a user interface comprising at least one user interface element specified at least in part by one or more template instances, each of said template instances specified at least in part by at least one template, said system comprising:
a processor operative to execute computer-executable instructions; and
memory having stored therein computer-executable instructions for performing steps comprising:
receiving a user selection of one or more selected template instances from among said template instances;
determining whether template editing relating to said user selection is desired or whether property editing related to said user selection is desired;
if template editing relating to said user selection is desired, providing functionality for user editing of a template corresponding to said selected template instances by:
determining at least one target templates corresponding to said selected template instances; and
providing functionality for performing an edit to said at least one target template; and
applying the edit to all template instances corresponding to the at least one target template; and
if property editing related to said user selection is desired, providing functionality for user editing of at least one property of said selected instances, the functionality for user editing of the at least one property of said selected instances comprising
creating a user interface element to which a template is to be applied, the user interface element having a plurality of properties and a template reference;
determining whether the template to be applied to the user interface element is a new template, an existing template, or a copy of the existing template;
if the template to be applied to the user interface element is a new template, creating an empty template, storing the empty template, and changing the template reference to reflect the stored template;
if the template to be applied to the user interface element is a copy of the existing template, creating the copy of the existing template, storing the copy of the existing template, and changing the template reference to reflect the stored template;
unlocking the template to be applied to the element;
receiving a user selection of at least one property of the user interface element;
setting the at least one selected property of the user interface element to a new value; and
locking the template to be applied to the user interface element.

* * * * *